United States Patent
Nystuen

[15] 3,697,841
[45] Oct. 10, 1972

[54] INDUCTION MOTOR STRUCTURE AND REVERSING CIRCUIT THEREFOR

[72] Inventor: Arne M. Nystuen, Stevensville, Mich.

[73] Assignee: Whirlpool Corporation, Benton Harbor, Mich.

[22] Filed: April 16, 1971

[21] Appl. No.: 134,579

[52] U.S. Cl.............318/207 A, 318/225, 318/227, 318/289, 318/290
[51] Int. Cl.............................................H02p 1/42
[58] Field of Search.... 318/207 R, 207 A, 207 B, 221 R, 318/227, 289, 290, 225

[56] References Cited

UNITED STATES PATENTS

| | | |
|---|---|---|
| 3,421,063 | 1/1969 | Reinke...................318/207 R |
| 3,432,736 | 3/1969 | Van Emden...........318/207 R |
| 3,528,103 | 9/1970 | Wolf.....................318/227 X |

*Primary Examiner*—Gene Z. Rubinson
*Attorney*—Hill, Sherman, Meroni, Gross & Simpson

[57] ABSTRACT

An induction motor having a squirrel cage rotor is provided with an additional stator winding which when energized in proper sequence with the original stator winding causes a rapid reversal of the motor. The additional stator winding may be located on the same axis as the original stator winding or may be spaced 90 electrical degrees from the original winding.

13 Claims, 11 Drawing Figures

PATENTED OCT 10 1972

INVENTORS
ARNE NYSTUEN

BY [signature] ATTORNEYS

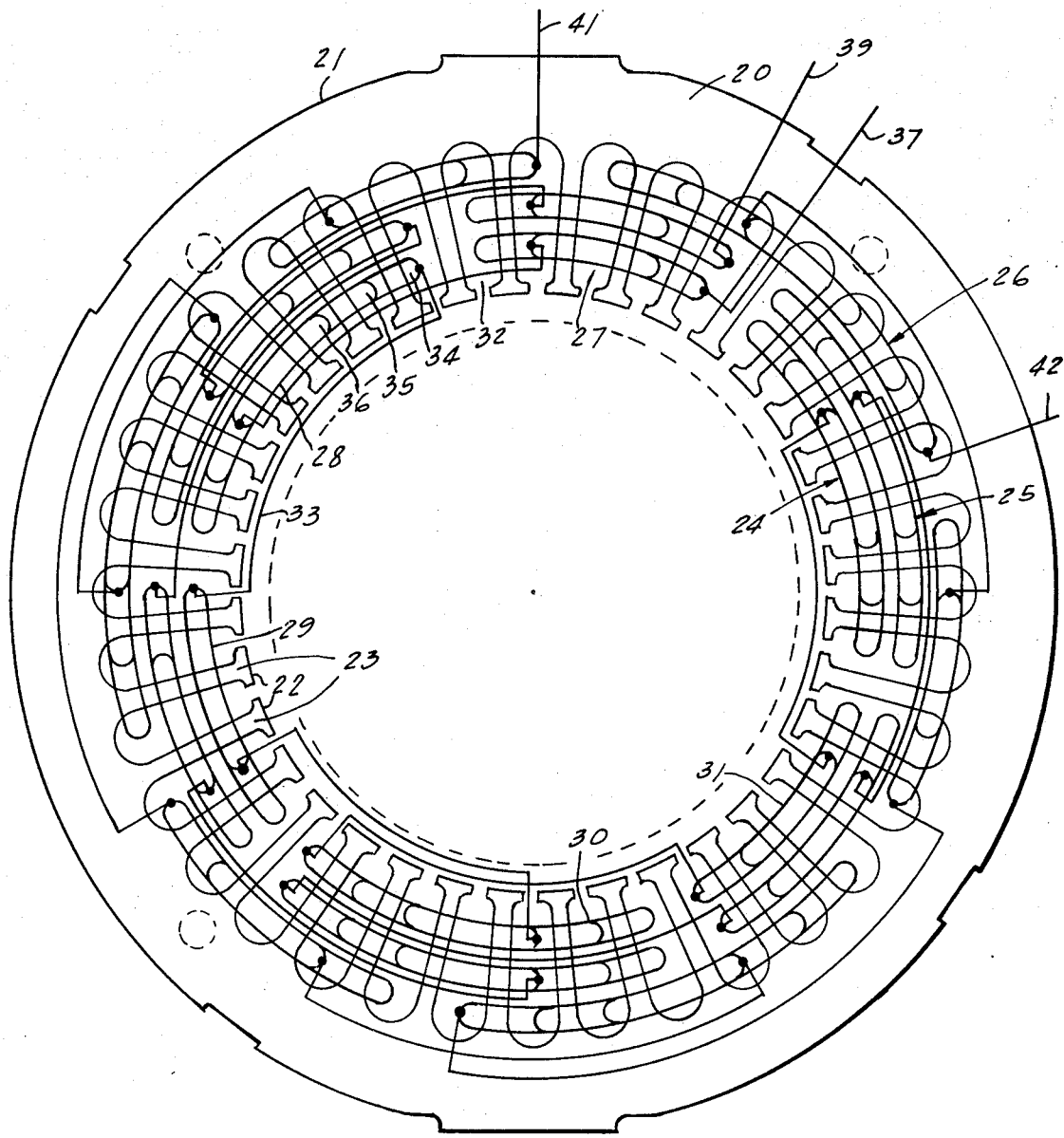

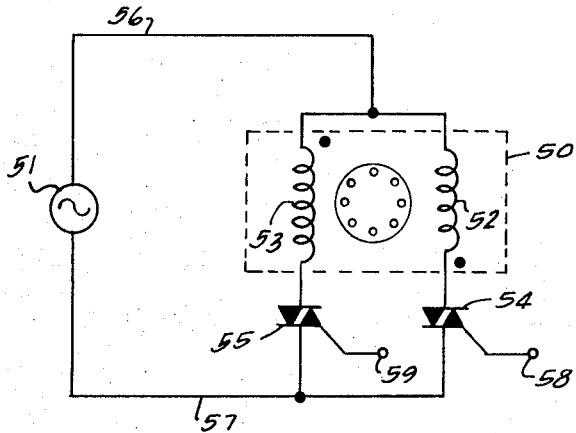
FIG. 3
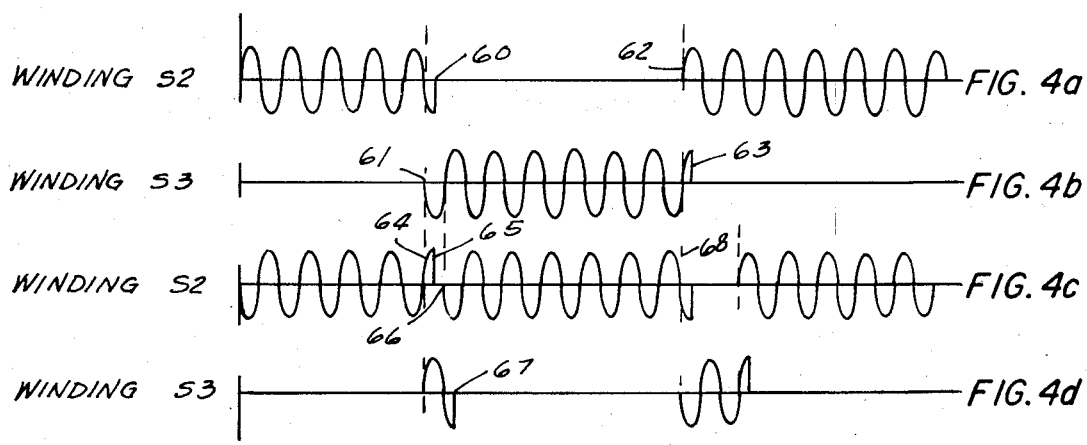
FIG. 4a
FIG. 4b
FIG. 4c
FIG. 4d

INDUCTION MOTOR STRUCTURE AND REVERSING CIRCUIT THEREFOR

BACKGROUND OF THE INVENTION

1. Field of the Invention

This invention relates to reversing motors, and in particular to induction motors and means for reversing such motors.

2. Description of the Prior Art

Heretofore, reversal of an induction motor was commonly accomplished by stopping the motor, reversing the leads of the start winding, and re-energizing the motor. In some cases, as for instance, in a permanent split capacitor motor, the connection of the start winding and capacitor is reversed by means of mechanical switches. In addition, the art recognizes the utilization of energy storage in a resilient member, which member is driven by a single phase induction motor until the motor stalls, whereupon the stored energy is released to reverse the direction of rotation of the motor. These various prior art techniques for reversing such motors have a number of disadvantages including: overheating of the motor due to operation for prolonged periods at low efficiency and low self-ventilating speeds; poor switch life due to long duration high energy electrical transients; high cost due to the requirement for large starting capacitors, complex feedback circuitry and additional ventilation; and difficulty in providing a system which can sustain a large number of reversals for an extended period.

SUMMARY OF THE INVENTION

It has been observed that a single phase induction motor running on its main winding will reverse its direction of rotation in response to properly synchronized polarity reversals of the applied alternating voltage. This motor reversal is extremely rapid and is effected when the applied voltage is reversed at a point where a very large reverse torque will be generated during the first half cycle following the polarity reversal. To obtain reliable and repeatable reversal of the motor, the polarity of the applied alternating voltage must be reversed in the vicinity of a zero crossing point of this voltage.

Although a conventional induction motor can be reversed in the aforementioned manner, the switching means required to accomplish periodic reversal is somewhat elaborate and costly. The instant invention comprises a motor construction and method of operating same which produces the same torque characteristic and attendant controlled rapid reversal of the motor as is encountered when the polarity of voltage applied to the main winding is reversed near a voltage zero crossing point. It is, therefore, an object of the present invention to provide a motor construction and method of operation to effect a controlled rapid reversal of the motor and yet require a minimum number of switching components. Further, the instant invention provides for the realization of another objective thereof, namely a simple, reliable and economic means for effecting numerous successive rapid motor reversals as desired.

In one embodiment, the motor is constructed by providing the stator with a second winding which is located on the same axis as the main stator winding and is generally the same size as the main stator winding. In another embodiment, the second stator winding is spaced 90 electrical degrees from the main stator winding.

DESCRIPTION OF THE DRAWINGS

FIG. 2 is a schematic illustration of a winding arrangement on a stator by which an induction motor may be constructed and used to practice the invention;

FIG. 3 is a schematic illustration of the motor and basic switching arrangement used to practice the invention; and FIGS. 4a–4d illustrated wave forms which may be applied to the various windings to effect the desired rapid reversal.

DESCRIPTION

As is well understood by those skilled in the art, the torque produced in a split phase induction motor is generally proportional to the product of the stator current and the induced rotor or armature current. Due to the phase difference between these currents, the instantaneous torque varies sinusoidally between positive and negative maximums. The frequency of this torque wave form is twice that of the applied voltage, and the maximum positive and negative torque amplitudes depend upon the motor load. As the motor load is increased, the net torque increases but sinusoidal variations are still present and points still exist at which the instantaneous torque is negative.

It has been found that if the polarity of the voltage applied to an induction motor is reversed in the vicinity of a zero crossing of the voltage that an extremely large pulse of negative torque will be generated which may be sufficient to reverse the direction of rotation of the motor. The torque pulse is a result of transient conditions which exist within the motor subsequent to the polarity reversal.

The rapid reversal of an induction motor in response to such a polarity reversal of the applied voltage can be readily understood with reference to FIG. 1. FIG. 1a illustrates the wave form of the voltage applied to the motor. At point 10 this voltage is made to undergo a polarity reversal or 180° phase shift by appropriate switch means. This polarity reversal produces a transient change in the stator current as illustrated graphically in FIG. 1b, wherein the current fails to make the usual zero crossing at point 11 but instead increases in amplitude before going through zero at the next successive zero crossing at point 12. Thus, the period of the stator current is increased or the effective frequency of the current decreased for a brief period of time following the polarity reversal, and the current achieves a greater amplitude during this interval than would be expected under steady state operation. As illustrated in FIG. 1c the induced rotor current also undergoes a transient beginning at a point 13 in response to the transient in the stator current.

Figure 1A:
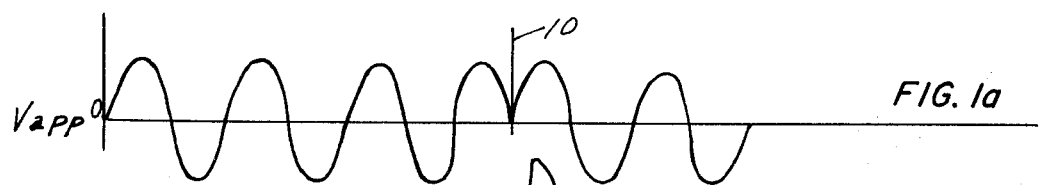
FIGS. 1a–1e are graphical illustrations of the wave forms present in the motor of the present invention during a rapid reversal.
Figure 1B:
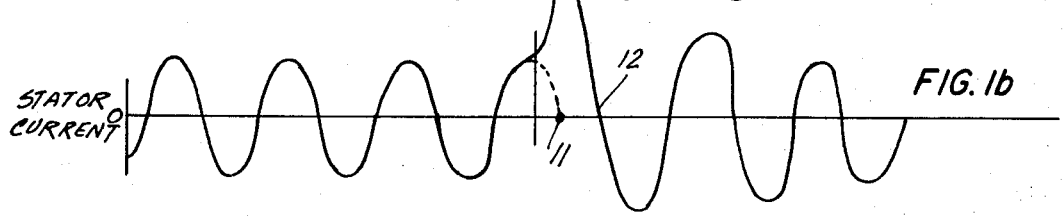
Figure 1C:
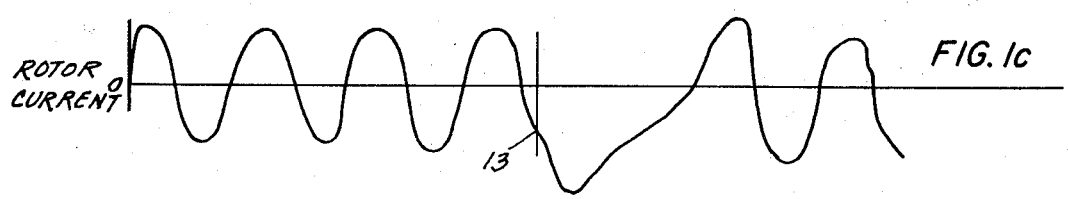
Figure 1D:
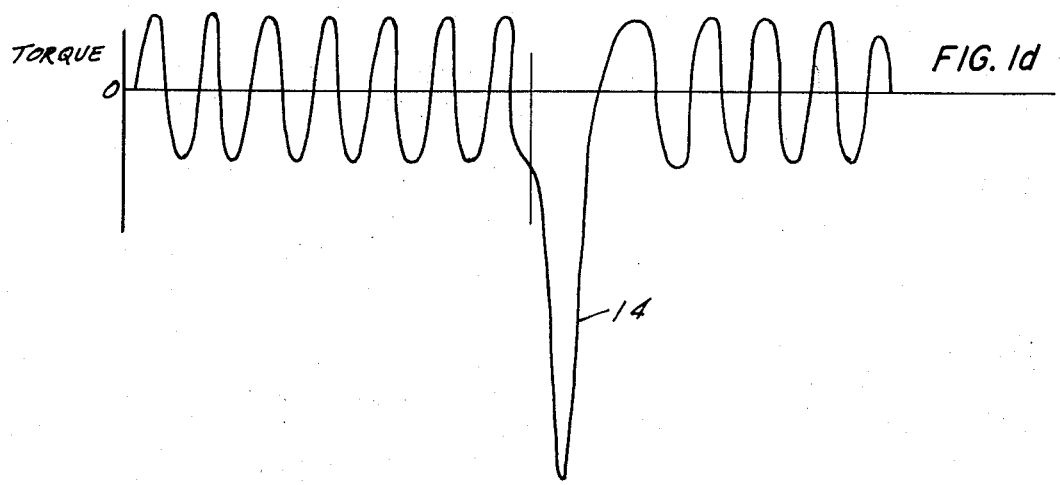
Figure 1E:
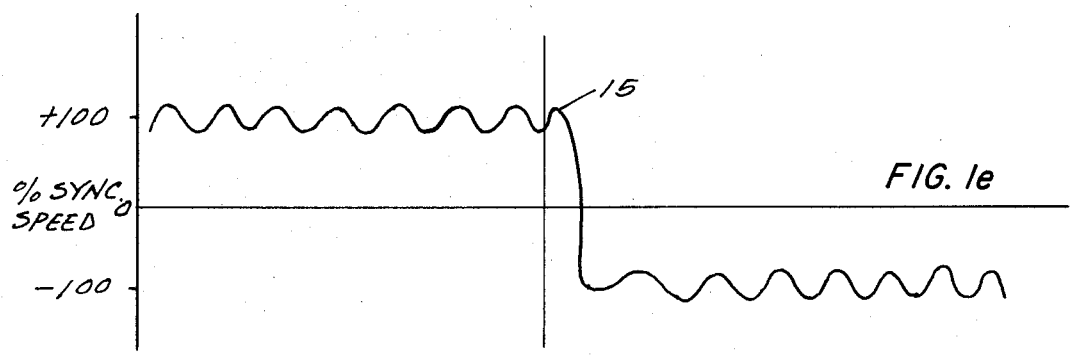

Inasmuch as the instantaneous torque is, for practical purposes, proportional to the product of the stator current and the induced armature current, the net effect of the transients in these two currents is to produce the extremely large torque pulse which is indicated at 14 of FIG. 1d. If the impulse created by the torque pulse 14 is sufficient to overcome the inertia of the rotor and load, an extremely rapid reversal of the direction of rotation of the rotor will result. FIG. 1e illustrates graphically such a reversal beginning at a point 15.

It should be noted that the transient conditions within the motor which generate the large negative torque pulse and thereby effect a rapid motor reversal will be caused by a polarity reversal of the voltage applied to the motor when the voltage is crossing zero from either direction. That is, a rapid motor reversal may be effected by reversing the polarity of the leads to the motor when the applied alternating voltage is crossing zero from negative to positive as well as from positive to negative. This can be easily understood by applying the foregoing analysis and description of the transients as illustrated in FIGS. 1a–1e directly to the case in which the polarity of the applied voltage to the motor is reversed in the vicinity of a zero crossing in which the voltage is going from a negative value to a positive value. This analysis will also reveal that the torque pulse developed in response to a properly synchronized polarity reversal of the voltage applied to the motor always opposes the previous direction of motor rotation.

Due to the fact that it is necessary to reverse the polarity of the applied voltage in the vicinity of a zero crossing of the voltage, the use of manually operated switching means is impractical. Further, although solid state switches may be used to reverse the polarity, it is still somewhat impractical to use such means to physically reverse the leads to an induction motor because four of such switches are normally required along with associated triggering means for this purpose. The present invention provides a motor construction and method of operating same which requires simpler switching, but yet effects the desired transient conditions and attendant rapid reversal of the induction motor.

FIG. 2 illustrates schematically how the stator of a conventional induction motor may be wound to practice two embodiments of the invention. A typical lamination from such a motor is represented at 20, having an outer periphery 21 and an inner periphery formed by the ends 22 of a plurality of teeth 23. The motor is provided with three separate six-pole windings, as indicated schematically at 24, 25 and 26.

Each of the windings 24, 25 and 26 consists of six sections or groups of windings, as for example, the winding designated generally as 24 is actually made up of a plurality of sections 27, 28, 29, 30 and 31, along with the section indicated at 24. The connections between these sections are of a conventional nature and are illustrated in FIG. 2 by means of conductors such as those seen at 32 and 33.

As is commonly done in winding an induction motor, various portions of each section enclose a different number of teeth and have a different number of turns so as to produce a nearly sinusoidal flux distribution within the motor. Again by way of example, the largest portion of each winding section may enclose six of the teeth 23, and may consist of 28 turns of number 18 wire. The intermediate portion of each winding section may enclose four pole pieces and may consist of 25 turns of number 18 wire; and the small portions of each winding section may enclose two teeth and consist of 14 turns of number 18 wire. This winding configuration is illustrated in FIG. 2, the major portion of the winding section 28 being indicated at 34, the intermediate portion at 35, and the small portion at 36.

As can be seen with reference to this figure, the winding indicated generally at 25 is wound about the same teeth and assumes the same configuration as the winding 24. Moreover, this winding may comprise the same number of turns as the winding 24.

The winding generally designated 26 is spaced or shifted radially with respect to the windings 24 and 25. Again, the number of turns of each section of winding 26 may be equal to the number of turns in the corresponding sections of windings 24 and 25.

A pair of leads 37 and 38 are provided for applying power to the winding 24. Similarly, power may be applied to the winding 25 by means of a pair of leads 39 and 40, and to the winding 26 by means of a pair of leads 41 and 42.

Using an induction motor wound in accordance with the foregoing description, the invention may be practiced by connecting the motor to a source of power as illustrated schematically in FIG. 3.

The motor, indicated generally at 50, is connected to an alternating voltage power source 51 which supplies voltage at the proper frequency and amplitude for operating the motor. The motor includes a pair of windings 52 and 53 which represent two of the three motor windings illustrated in FIG. 2. In one embodiment, the windings 52 and 53 may comprise two similar stator windings wound about the same axis, as would be the case if the windings 24 and 25 of FIG. 2 were used. These windings are connected in opposite polarity sense between power supply lines 56 and 57 as illustrated in FIG. 3, and a pair of switch means 54 and 55 are interposed between one end of each winding and one of the power supply lines. By way of example, the switch means 54 and 55 may comprise triacs as shown in FIG. 3, the triac 54 having a control electrode 58 and the triac 55 having a control electrode 59.

It should be noted that other types of bidirectional switch means may be used in place of the triacs 54 and 55, as for instance mechanical switches or relays; however, the use of triacs allows relatively precise control of the point at which the windings are energized, and such control is advantageous in practicing the instant invention.

Using the motor and switching arrangement of FIG. 3, a rapid reversal of the motor may be effected by energizing the stator windings 52 and 53 as indicated graphically in FIGS. 4a–4d. If the motor is running near synchronous speed in normal fashion under the influence of one of the stator windings, for example the winding 52, a rapid reversal will occur if near a zero crossing of the applied voltage, proper potentials are applied to the control electrodes 58 and 59 whereby the triac 55 is turned on and a short time later triac 54 is turned off. This effectively transfers power from the winding 52 to the winding 53 as illustrated by FIGS. 4a and 4b. The curve of FIG. 4a represents the voltage applied to the winding 52 of the motor and the curve of FIG. 4b represents the voltage applied to the winding 53. As can be seen from these curves, the line voltage is illustratively removed from winding 52 at a point 60 and applied to the winding 53 at a point 61, which represents a zero crossing of the applied voltage. Although switching signals are applied to the control electrodes 58, 59 of the triacs 54 and 55 to initiate the power transfer between the windings 52 and 53 at the point 61, the triac 54 will not cease conducting until the current passing therethrough drops to some small value. This accounts for the fact that the turnoff point 60 for the triac 54 is shown in FIGS. 4a–4d, to occur after the turn on point 61 for the triac 55.

A second motor reversal is initiated at the point 62 of the curves of FIGS. 4a and 4b. The point 62 represents a zero crossing of the applied voltage, and at this time a control signal is applied to the gate 58 of the triac 54 so as to energize the winding 52 while the control signal is simultaneously removed from the gate 59 of the triac 55 thereby deenergizing this triac at such time as the current therethrough drops to some small value. The turnoff point of the triac 55 is illustratively indicated at a point 63.

The curves of FIGS. 4c and 4d illustrate another method of energizing the induction motor to generate the transients and resultant rapid reversal as illustrated graphically in FIGS. 1a–1e. The curve of FIG. 4c represents the voltage applied to the winding 52 and the curve of FIG. 4d represents the voltage applied to the winding 53. As indicated by the curves of FIGS. 4c and 4d, rather than transferring power between the windings 52 and 53 and allowing the second winding 53 to remain energized, a reversal may be effected by transferring power only for a brief period after which the power is returned to the winding 52 which was originally energized. A reversal is initiated at a point 64 in the figure, at which time the winding 53 is energized. The winding 52 is deenergized at a point 65 and power is returned to the winding 52 at a point 66, with power being removed from the winding 53 at a point 67. Again, the lag in the turnoff or deenergization of the windings is due to the well known operation characteristics of the triac switches 54 and 55.

A second motor reversal is initiated at a point 68 of the curves of FIGS. 4c and 4d. Power is again transferred briefly from the winding 52 to the winding 53 and then returned to the winding 52. However, in this case the interval of time between the energization of the winding 53 and the reenergization of the winding 52 is seen to be three half cycles of the applied voltage, whereas the corresponding interval associated with the reversal initiated at 64 is seen to comprise one-half cycle of the applied voltage.

When operating the motor illustrated by the curves of FIGS. 4c and 4d, it should be noted that when the interval over which the second winding is energized becomes sufficiently long for steady state conditions to be re-established within the motor then transferring power back to the original winding will result in a second reversal. That is, the mode of operation illustrated by the curves of FIGS. 4a and 4b would then be encountered.

The curves of FIGS. 4a–4d also illustrate the fact that a reversal of the motor will result when power is transferred with the applied voltage going through a zero amplitude point from positive to negative as at the point 60 or from negative to positive as at the point 62.

Reversal has also been accomplished by transferring power between windings for an interval comprising a full cycle of the applied voltage, but this method of operation was found to provide less satisfactory reversal under certain load conditions. This poor performance is due to the fact that during the second half cycle, the transient conditions within the motor tend to oppose rather than to aid the transient conditions generated during the first half cycle of energization.

Operating triacs 54 and 55 by the methods illustrated in FIGS. 4a–4d, the modified induction motor can be rapidly reversed as desired, including a prolonged series of repeated reversals. The reversal effected by operating the motor in this manner is extremely rapid, the motor being driven to an initial negative speed within approximately 10 milliseconds and reaching synchronous speed in the reverse direction within approximately 100 milliseconds, depending upon the characteristics of the system. Zero crossings may be detected and utilized for effecting motor reversals by means of various available equipment including a DATAPULSE generator, Models 101 and 201 manufactured by the Datapulse Division of Systron-Donner Corporation of Culver City, California, or a Fairchild MA742 Zero Crossing AC Trigger-Trigac Circuit as manufactured by the Fairchild Semiconductor Division of Fairchild Camera & Instrument Corporation of Mountain View, California.

Computer studies of this system and experimental data indicate that the motor is indeed reversed by the same transient phenomena which cause reversal when the polarity of the stator winding of a conventional induction motor is reversed near a zero crossing of the applied voltage. The stator current, rotor current, torque characteristic and speed curve for the motor operated in the aforementioned manner are essentially the same as illustrated in FIG. 1.

The motor wound in accordance with the configuration shown in FIG. 2 can also be made to undergo the transient related rapid reversal by employing one of the stator windings 24 or 25 and the spaced stator winding 26 and operating the motor in accordance with the methods taught by the curves of FIGS. 4c and 4d. The second spaced stator winding is again connected between the power supply lines 56 and 57 in opposite polarity sense to the first stator winding and is controlled by a triac or the like. The second spaced stator winding differs from a conventional start winding in that continuous energization of this and the main stator winding will not start the motor. Further, no capacitor is associated with this winding as is frequently the case with start windings, and the winding is of the same size as the first stator winding, which is generally not true of start windings.

The foregoing description of methods by which the motor may be energized utilizes the transfer of power between motor windings in the vicinity of zero crossings of the applied voltage. It has been found that if power transfer takes place substantially at a zero crossing, extremely reliable and repeatable motor reversal and characteristic wave forms are obtained. Some latitude as to the point at which power is transferred is functionally acceptable, and in general the allowable amount of deviation from the zero crossing point has been found to depend upon the particular characteristics of the motor and load. For example, it has been found that a 53° lag beyond the zero voltage crossover before power is transferred can produce reliable motor reversals. However, the transients which produce the large negative torque pulses necessary to effect reversals are normally best initiated by transferring power substantially at a zero crossing of the applied voltage.

It will be appreciated by those skilled in the art that the aforementioned construction and method of operation provide an improved means for reversing an induction motor. This system eliminates the necessity for electronic circuitry to sense motor parameters or feedback circuitry as has been previously employed in reversible motor systems. Additional cooling or ventilating apparatus is not required because the mechanical transients are of short duration, and reversal is almost instantaneous so that the motor speed is sufficiently high at all times to prevent overheating and to provide good self-ventilating action.

While I have described my invention with reference to specific illustrative embodiments thereof, changes and modifications of the invention may become apparent to those skilled in the art and it is to be understood that I wish to include within the patent warranted hereon all such changes and modifications as may be reasonably and properly included within the scope of my invention.

The embodiments of the invention in which an exclusive property or privilege is claimed are defined as follows.

1. The method of reversing an induction motor provided with a rotor and having first and second stator windings comprising: applying an alternating voltage wave having zero crossings to the first of said stator windings to effect rotation of said rotor in a first direction; removing said alternating voltage wave from said first winding in response to and substantially at a selected zero voltage crossing of said wave; and applying said voltage wave to said second stator winding in response to and at said selected zero voltage crossing of said wave to effect rotation of said rotor in a second direction.

2. The method of claim 1 further including the step of transferring the alternating voltage wave from said second winding back to said first winding before steady state current conditions have been established within the motor.

3. The method of claim 1 further including the step of transferring the alternating voltage wave from said second winding back to said first winding after said second winding has been energized for one-half cycle of said alternating voltage wave.

4. The method of claim 1 further including the step of transferring the alternating voltage wave from said second winding back to said first winding after said second winding has been re-energized for a period comprising an odd number of half cycles of said alternating voltage wave.

5. The method of generating a large torque pulse of short duration within an induction motor provided with a rotor and having two stator windings comprising: applying an alternating voltage wave having zero crossings to a first of said stator windings; removing said alternating voltage wave from said first winding in response to and substantially at a selected zero voltage crossing of said wave; and applying said alternating voltage wave to said second stator winding at said selected zero crossing of said alternating voltage wave.

6. A motor reversing circuit comprising: input terminals for receiving an alternating voltage wave having cyclic zero crossover points; a rotor; first and second stator windings inductively coupled to said rotor and connected in opposite polarity sense across said input terminals; and reversing means including switching means serially interposed in the connection between respective ones of said windings and said input terminals, said switching means being operative in response to and at selected zero crossing points of said alternating voltage wave to selectively transfer power between said stator windings.

7. The circuit of claim 6 wherein said first and second stator windings are wound about the same axis.

8. The circuit of claim 6 wherein said first and second windings are spaced 90 electrical degrees.

9. A motor reversing circuit according to claim 6, wherein said switching means includes semiconductor switch means.

10. A reversible induction motor circuit comprising: a rotor; a stator structure including a laminated core and first and second stator windings wound on said core and inductively coupled to said rotor, said stator windings defining a plurality of poles and each of said stator windings having input terminals for receiving an alternating voltage wave having periodic zero crossover points; and means for reversing the direction of rotation of the motor including switching means connected to said input terminals for selectively transferring the application of alternating voltage between said stator windings in response to and at selected zero crossover points of the alternating wave.

11. The circuit of claim 10 wherein said first and second stator windings are wound about the same axis.

12. The circuit of claim 10 wherein said first and second windings are spaced 90 electrical degrees.

13. A motor reversing circuit according to claim 10, wherein said switching means includes semiconductor switch means.

* * * * *